US011307452B2

(12) United States Patent
     Hong

(10) Patent No.: US 11,307,452 B2
(45) Date of Patent: Apr. 19, 2022

(54) BACKLIGHT DEVICE AND DISPLAY APPARATUS

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 92 days.

(21) Appl. No.: 16/814,367

(22) Filed: Mar. 10, 2020

(65) Prior Publication Data

US 2021/0088843 A1 Mar. 25, 2021

(30) Foreign Application Priority Data

Sep. 20, 2019 (CN) .......................... 201910891208.X

(51) Int. Cl.

| G02F 1/13357 | (2006.01) |
|---|---|
| F21V 8/00 | (2006.01) |
| G02F 1/1335 | (2006.01) |
| G02F 1/13363 | (2006.01) |

(52) U.S. Cl.
CPC ..... *G02F 1/133602* (2013.01); *G02B 6/0016* (2013.01); *G02B 6/0063* (2013.01); *G02F 1/13362* (2013.01); *G02F 1/13363* (2013.01); *G02F 1/133512* (2013.01)

(58) Field of Classification Search
CPC .... G02B 6/0016; G02B 6/002; G02B 6/0031; G02B 6/005; G02B 6/0056; G02B 6/0063; G02F 1/133512–13363
See application file for complete search history.

(56) References Cited

U.S. PATENT DOCUMENTS

| 2015/0219960 A1 | 8/2015 | Seo et al. |
| 2019/0285935 A1 | 9/2019 | Tan |
| 2019/0324186 A1 | 10/2019 | Tan |
| 2020/0005718 A1* | 1/2020 | Fattal .................. G09G 3/3406 |

FOREIGN PATENT DOCUMENTS

| CN | 1539095 A | 10/2004 |
| CN | 108415191 A | 8/2018 |
| CN | 108572482 A | 9/2018 |
| CN | 109212834 A | 1/2019 |
| CN | 109884820 A | 6/2019 |
| CN | 110187562 A | 8/2019 |
| CN | 110244492 A | 9/2019 |
| WO | 2018067752 A1 | 4/2018 |

OTHER PUBLICATIONS

First Chinese Office Action dated Apr. 14, 2020, for corresponding Chinese Application No. 201910891208.X.

* cited by examiner

*Primary Examiner* — Jason M Han
(74) *Attorney, Agent, or Firm* — Kinney & Lange, P.A.

(57) ABSTRACT

The present disclosure provides a backlight device and a display apparatus. The backlight device includes: a light guide plate having a light exit face and a light entrance face, and a plurality of light extraction structures disposed on the light exit face. A light beam is totally reflected in the light guide plate, and can enter the light extraction structure through a surface of the light extraction structure that is in contact with the light exit surface of the light guide plate. The light extraction structure is configured to converge its output light beam when the backlight device is used in a dark display state, and diverge its output light beam when the backlight device is used in the grayscale display state.

12 Claims, 2 Drawing Sheets

BACKLIGHT DEVICE AND DISPLAY APPARATUS

CROSS-REFERENCE TO RELATED APPLICATIONS

This application claims the priority to Chinese Patent Application No. 201910891208.X filed on Sep. 20, 2019 and entitled "BACKLIGHT DEVICE, AND DISPLAY APPARATUS," the disclosure of which is incorporated herein by reference in its entirety.

TECHNICAL FIELD

Embodiments of the present disclosure relate to the field of display technology and particularly to a backlight device and a display apparatus.

BACKGROUND

Currently, in a display apparatus, a Lambertian light emitted from the light-emitting diode (LED) light source can be modulated by a free-form mirror, and coupled at a certain angle to enter a light guide plate. The light is totally reflected in the light guide plate and may be extracted from an extraction grating provided on an upper side or lower side of the light guide plate. In this case, the function of the extraction grating is to take out the light at a collimation angle, which is totally reflected at large-angle and propagated in the light guide plate, and achieve a collimated light source with higher transmittance.

However, the current backlight device structure design has low transparency, light output and contrast.

SUMMARY

In a first aspect of the present disclosure, there is provided a backlight device including:

a light guide plate having a light exit face and a light entrance face; and a plurality of light extraction structures disposed on the light exit face of the light guide plate, and wherein a light beam is totally reflected in the light guide plate, and can enter the light extraction structure through a surface of the light extraction structure that is in contact with the light exit surface of the light guide plate, and the light extraction structure is configured to converge its output light beam when the backlight device is used in a dark display state, and diverge its output light beam when the backlight device is used in a grayscale display state.

According to an embodiment of the present disclosure, each of the light extraction structures comprises: a light extraction grating arranged on the light exit face so as to extract light from the light exit face of the light guide plate; a polarization conversion element disposed on a side of the light extraction grating away from the light exit surface, and configured to convert the light extracted by the light extraction grating into a predetermined first polarization state in the dark display state and convert the light extracted by the light extraction grating into a predetermined second polarization state in the grayscale display state; a birefringent microlens disposed on a side of the polarization conversion element away from the light exit surface, and configured to converge the linearly polarized light in the first polarization state from the polarization conversion element in the dark display state and diverge the linearly polarized light in the second polarization state from the polarization conversion element in the grayscale display state, wherein the first polarization state is different from the second polarization state; and a filling layer covering a surface of the birefringent microlens away from the polarization conversion elements.

According to an embodiment of the present disclosure, the backlight device further comprises a polarizer configured so that a light, after passing through the polarizer, becomes linearly polarized light and enters the light guide plate.

According to an embodiment of the present disclosure, the birefringent microlens is a convex lens and is formed of a birefringent material, and a refractive index of a material for forming the filling layer is between a first refractive index of the birefringent material for the linearly polarized light in the first polarization state and a second refractive index of the birefringent material for the linearly polarized light in the second polarization state.

According to an embodiment of the present disclosure, the polarization conversion elements each include a first electrode, a first orientation layer, a polarization conversion liquid crystal layer, a second orientation layer, and a second electrode which are stacked in that order.

According to an embodiment of the present disclosure, the first electrode and the second electrode are formed of a transparent conductive material.

According to an embodiment of the present disclosure, an orthographic projection of the light extraction grating on the light exit face and an orthographic projection of the polarization conversion element on the light exit face coincide.

According to an embodiment of the present disclosure, the backlight device further comprises a light source, from which light enters the light guide plate through the light entrance face.

According to an embodiment of the present disclosure, the light extraction grating is configured to extract an incident light at a specific angle and extract no light at other angles.

According to an embodiment of the present disclosure, the light extraction grating is formed by plating a layer on the light guide plate and etching the plated layer.

As a second aspect of the present disclosure, there is provided a backlight device, comprising:

a light guide plate having a light exit face and a light entrance face;

a light source disposed on the light entrance face; and a plurality of holographic optical elements disposed on the light exit face such that a light beam emitted by the light source is totally reflected in the light guide plate and is converged and outputted from the holographic optical element.

According to an embodiment of the present disclosure, the holographic optical elements each are formed of a photosensitive material and each have an interference fringe formed on a surface thereof close to the light exit face.

As a third aspect of the present disclosure, there is provided a display apparatus comprising a display module and the backlight device as claimed in claim 1, the display module being provided on a light output face of the backlight device.

According to an embodiment of the present disclosure, the display module comprises: a liquid crystal layer arranged on a side of the plurality of light extraction structures, so that a light outputted by the plurality of light extraction structures irradiate the liquid crystal layer; and a black matrix arranged on a side of the liquid crystal layer away from the light extraction structures, openings being defined in the black matrix.

Additional aspects and advantages of the present disclosure will be given in part in the following description, and part of it will become apparent from the following description, or be learned through practice of the present disclosure.

BRIEF DESCRIPTION OF THE DRAWINGS

The above aspects of the present disclosure will be described by the description of the embodiments with reference to the following drawings, in which.

DETAILED DESCRIPTION

The embodiments of the present disclosure are described in detail below, and those skilled in the art will understand that the following embodiments are intended to explain the present disclosure and should not be construed as limiting the present disclosure. Unless specifically stated, for specific techniques or conditions that are not explicitly described in the following examples, those skilled in the art may perform them according to the techniques or conditions commonly used in the art or according to product specifications.

In one aspect of the present disclosure, the present disclosure provides a backlight device.

Figure 1:
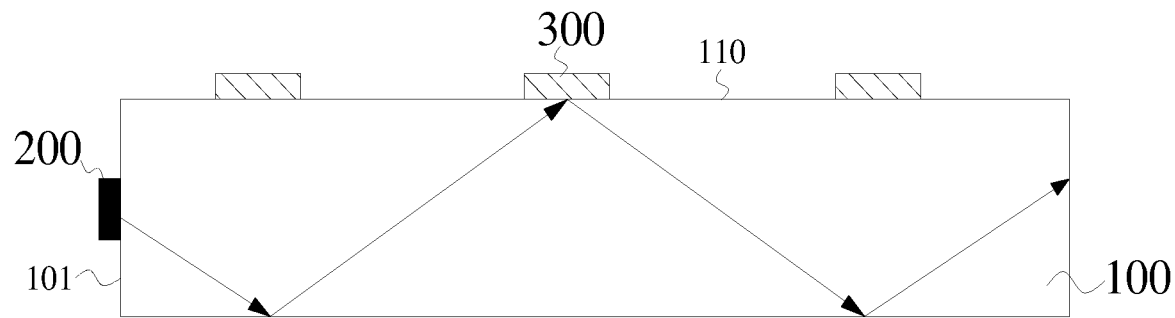
FIG. 1 is a schematic cross-sectional view showing a structure and a light emitting path of a backlight device according to an embodiment of the present disclosure.

According to an embodiment of the present disclosure, referring to FIG. 1, the backlight device includes a light guide plate 100, a light source 200, and a plurality of light extraction structures 300; wherein the light guide plate 100 has a light exit face 110 and a light entrance face 101; and the plurality of light extraction structures 300 are disposed on the light exit face 110.

In an embodiment of the present disclosure, the backlight device may include a light source 200 disposed at the light entrance face 101. The light source 200 may be disposed on or near the light entrance face 101, and a light of the light source 200 may enter through the light entrance face 101 into the light guide plate 100. The light source may be a visible light source or a monochromatic light source, such as an LED light source, a micro-LED, or a micro-OLED. However, the backlight device is not necessary to include a light source.

Figure 2:
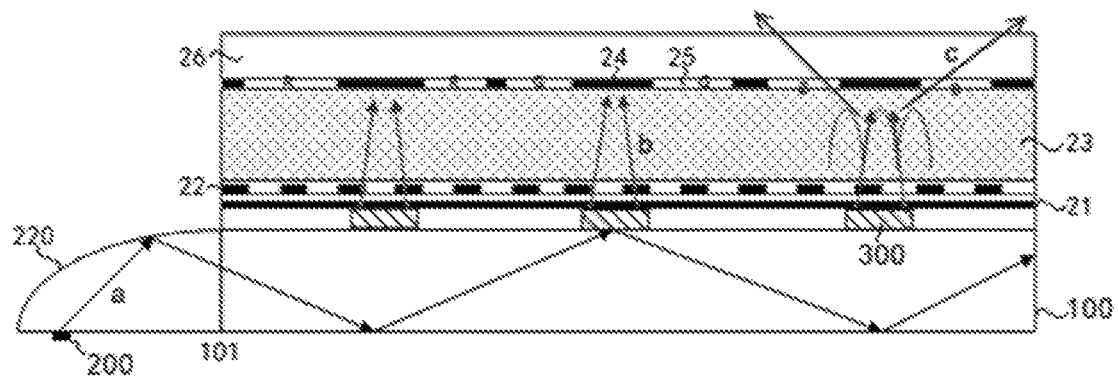
FIG. 2 is a schematic diagram of different displays of a display device by converging and outputting light from a backlight device according to an embodiment of the present disclosure.

In another embodiment of the present disclosure, referring to FIG. 2, the light source 200 may be disposed on a free-form mirror 220 for the light entrance face 101, and the light beam a emitted from the light source 200 is totally reflected in the light guide plate 100.

According to the embodiment of the present disclosure, the light in the light guide plate 100 may enter the light extraction structure 300 from a surface of the light extraction structure 300 that is in contact with the light exit face 101 of the light guide plate 100. According to the embodiment of the present disclosure, the light extraction structure 300 is configured to converge an output light beam b in a dark display state, and diverge the output light beam c in a grayscale display state. In other words, the light extraction structure 300 is capable of extracting light from the light guide plate 100, and is used to converge the light beam b in the dark display state, and diverge the light beam c in the grayscale display state.

In the backlight device of the embodiment of the present disclosure, the light extraction structure on the light exit face of the light guide plate can make the light beam emitted by the light source, after being totally reflected in the light guide plate, be outputted and converged or diverged, so that a display apparatus containing the backlight device may have a more transparency, higher contrast, and higher light output efficiency.

In this embodiment, when a display liquid crystal layer 23 provided on a light emitting face of the backlight device is in a transparent state, the light beam b passes through the display liquid crystal layer 23 and is blocked by a black matrix 24 achieving a dark display state (L0); when different voltage signals are applied between a common electrode and a pixel electrode, the display liquid crystal layer 23 is in a grating state and thus different diffraction efficiency of the liquid crystal layer 23 like a grating on the light beam b can be achieved, so that the light beam c passes through an opening 25 between the black matrix 24 and then a color film layer (such as a red resistor R, a green resistor G, or a blue resistor B in FIG. 2), thereby realizing a color display state of a variety of grayscales.

It is found in the research process that a light extraction grating is provided on an upper surface or a lower surface of a light guide plate of an existing backlight device and can only achieve emitting a collimated light. With this configuration, in order to avoid the problem of light leakage due to a light divergence angle, it is necessary that a width of the black matrix in the display apparatus is larger than a width of the light extraction grating. However, at the same time, in order to improve a light output efficiency of the display apparatus, a wider light extraction grating is required, which results in a large size of the black matrix and thus the maximum transparency of the display apparatus reaching only 60%. Therefore, the light extraction structure 300 is designed that can realize emitting light in a convergent mode of the backlight device. With this light extraction structure 300, the width of the black matrix 24 can be effectively reduced and the width of the opening 25 can be effectively increased, thereby effectively improving the transparency of the display apparatus. Further, the light extraction structure 300 can also suppress diffracted stray light, thereby improving a contrast of the display apparatus.

Figure 3:
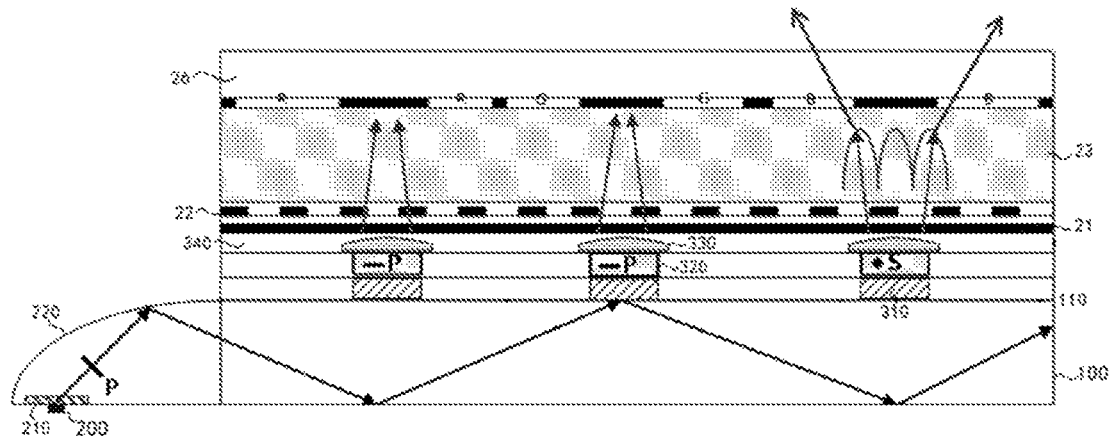
FIG. 3 is a schematic diagram of different display of a display device by converging and outputting light from a backlight device according to another embodiment of the present disclosure.

In some embodiments of the present disclosure, referring to FIG. 3, the light extraction structures 300 (not indicated in FIG. 3) each may include a light extraction grating 310, a polarization conversion element 320, a birefringent microlens 330, and a filling layer 340, wherein the light extraction gratings 310 may be disposed on the light exit face 110 to extract light from the light exit face 110 of the light guide plate 100; the polarization conversion elements 320 may be disposed on a side of the light extraction grating 310 away from the light exit face 110, and the polarization conversion elements 320 each are configured to converge a light beam outputted in the dark display state and diverge the light beam outputted in grayscale display state; the birefringent microlens 330 may be disposed on a side of the polarization conversion elements 320 away from the light exit face 110; and the filling layer 340 may cover a surface of each of the birefringent microlens 330 that is away from the polarization conversion elements 320. In one embodiment, the plurality of light extraction gratings 310 are arranged in a dot array on the light exit face 110, and a collimated light extracted by the light extraction gratings 310 can be converted into a polarized light by the polarization conversion elements 320, and then, after passing through an interface between the birefringent microlens 330 and the filling layer 340, is formed as a converged light or a diverged light. Specifically, the light extraction gratings 310 and the polarization conversion elements 320 may be covered by a planarization layer, and a planarization layer may also be provided between the light extraction grating 310 and the polarization conversion element 320, so that a certain thickness of space is maintained between the two.

In some embodiments of the present disclosure, referring to FIG. 3, a polarizer 210 may be further provided between the light source 200 and the light guide plate 100. For example, a polarizer 210 such as a linear polarizing film may allow the light emitted by the light source 200 to, after passing through the polarizer 210, become a linearly polarized light.

In some specific examples, the linearly polarized light passing through the polarizer 210 may be P-polarized light. In some embodiments, the linearly polarized light passing through the polarizer 210 may be S-polarized light. According to the embodiment of the present disclosure, the polarizer 210 is provided to ensure that the light introduced into the light guide plate 100 is a linearly polarized light. In some embodiments, the polarizer 210 may not be included. In one embodiment, the birefringent microlens 330 may each be a convex lens and formed of a birefringent material, and a refractive index n of a material for forming the filling layer 340 is less than an ordinary refractive index $n_o$ of the birefringent material and not greater than an extraordinary refractive index $n_e$ of the birefringent material, that is, $n_o > n \geq n_e$. In this configuration, the polarizer 210 is provided to introduce a linearly polarized light into the light guide plate 100, and the polarization conversion elements 320 are provided on a side of the light extraction gratings 310 so that a light with a desired polarization state may be introduced into the birefringent microlens 330; the birefringent microlens 330 are provided to produce a convergent or divergent effect on the light with a desired polarization state, and a combined effect of the birefringent microlens 330 and the filling layer 340 is used to achieve the convergence and divergence of the emitting light. With this design, when the black display state (L0) is required, the polarization state of the light is converted to a predetermined polarization state (for example, P-polarized light) by the polarization conversion elements 320, so that the refractive index of the birefringent microlens 330 is greater than the refractive index of the filling layer 340 and the birefringent microlens realize the function of a convex lens performing a converging effect on the light; when the grayscale display is required, the polarization state of the light is converted to another predetermined polarization state (for example, S-polarized light) by the polarization conversion elements 320, so that the refractive index of the birefringent microlens 330 is less than the refractive index of the filling layer 340, and the birefringent microlens realizes the function of a concave lens performing a diverging effect on the light. At this time, the liquid crystal grating is active and, in combination with a dispersing effect of the liquid crystal grating, obtains a display of various grayscales.

Figure 4:
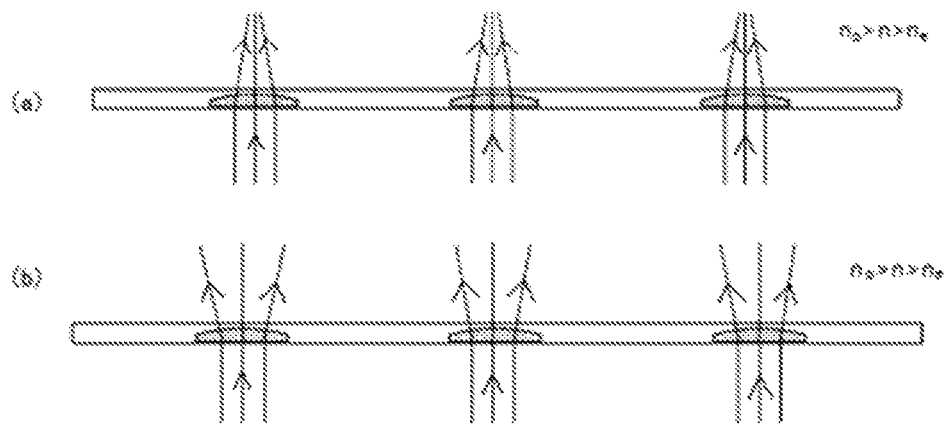
FIG. 4 is a schematic diagram of light effects of birefringent microlenses and a filling layer on P-polarized light (a) and S-polarized light (b) according to another embodiment of the present disclosure.

Specifically, referring to (a) of FIG. 4, for P-polarized light, the refractive index of the birefringent material is $n_o$. Because $n_o > n$, the birefringent microlenses each behave as a convex lens and perform the converging effect on the light. The converged light is absorbed by the black matrix, and due to convergence of the light, a problem of low contrast caused by a stray light generated by the diffraction of the light extraction grating and other small apertures (such as the electrode layer of the liquid crystal grating) that cannot be effectively blocked by the black matrix in the L0 dark display state can be eliminated. As the influence of the stray light on the dark display state (L0) can be eliminated, the contrast of the display apparatus can be increased. At the same time, the width of the black matrix can be also reduced, thereby improving the transparency of the transparent display. Referring to (b) of FIG. 4, as for S-polarized light, the refractive index of the birefringent material is $n_e$. Because $n > n_e$, the birefringent microlenses perform, as concave lenses, a diverging effect on the light. In this way, the diverged light can be further dispersed after passing through the liquid crystal grating, thereby obtaining a display of a variety of grayscales. Due to the divergence effect of an array composed of the light extraction gratings, the polarization conversion elements and the birefringent microlenses, more light can pass through and is dispersed by the liquid crystal grating without being blocked by the black matrix, which also improves a display effect of a transparent display, and further improves the display effect of the display apparatus.

In another embodiment of the present disclosure, referring also to (a) of FIG. 4, the birefringent material of the birefringent microlenses is set so that, for the S-polarized light, the refractive index of the birefringent material is $n_o$, and the birefringent microlenses each behave, as a convex lens, perform a converging effect on the light due to $n_o > n$. In this way, the converged light is absorbed by the black matrix, and due to the converging effect on the light, a problem of low contrast caused by the stray light generated by the diffraction of the light extraction grating and other small apertures (such as the electrode layer of the liquid crystal grating) that cannot be effectively blocked by the black matrix in the L0 dark display state can be eliminated. As the influence of the stray light on the dark display state (L0) can be eliminated, the contrast of the display apparatus can be increased. At the same time, the width of the black matrix can be also reduced, thereby improving the transparency of the transparent display. Referring to (b) of FIG. 4, as for the P-polarized light, the refractive index of the birefringent material is $n_e$. Because $n > n_e$, the birefringent microlenses each perform, as a concave lens, a diverging effect on the light. In this way, the diverged light can be further dispersed after passing through the liquid crystal grating, thereby obtaining a display of a variety of grayscales. Due to the divergence effect of an array composed of the light extraction gratings, the polarization conversion elements and the birefringent microlenses, more light can pass through and is dispersed by the liquid crystal grating without being blocked by the black matrix, which also improves a display effect of a transparent display, and further improves the display effect of the display apparatus.

For the birefringent microlenses, their convergence or divergence effect on the linearly polarized light can be achieved by selecting different birefringent materials. The birefringent material for the birefringent microlenses has a first refractive index for a linearly polarized light in a first polarization state and a second refractive index for a linearly polarized light in a second polarization state. In the embodiment of the present disclosure, the refractive index of the material for forming the filling layer is between the refractive index of the birefringent material for the linearly polarized light in the first polarization state and the refractive index of the birefringent material for the linearly polarized light in the second polarization state.

Figure 5:
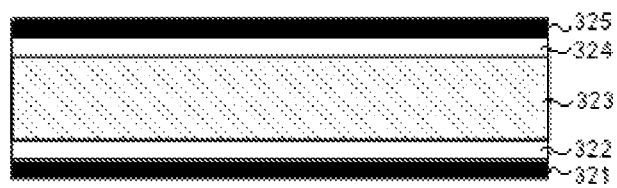
FIG. 5 is a schematic structural diagram of a polarization conversion element according to an embodiment of the present disclosure.

In some embodiments of the present disclosure, referring to FIG. 5, the polarization conversion elements 320 may each include a first electrode 321, a first orientation layer 322, a polarization conversion liquid crystal layer 323, a second orientation layer 324, and a second electrode 325, which are stacked. In this way, the polarization state of the light can be converted by electrically controlling the liquid crystal state in the polarization conversion liquid crystal layer 323. Specifically, for example, P-polarized light passes through the polarization conversion liquid crystal layer 323 in a transparent state to which no voltage is applied, and remains P-polarized light, and however, P-polarized light can be converted into S-polarized light after passing through the polarization conversion liquid crystal layer 323 to which voltage is applied, so that the converted polarized light can be converged or diverged by the birefringent microlens array.

In some specific examples, the first electrode 321 and the second electrode 325 may be formed of a transparent conductive material. In this way, the transparent electrodes do not greatly reduce the transmittance of the light while achieving the electrical control of the polarization state of the light, so that the light output rate of the backlight device is higher.

In some specific examples, referring to FIG. 3, orthographic projections of the light extraction gratings 310 on the light exit face 110 may completely coincide with orthographic projections of the polarization conversion elements 320 on the light exit face 110. In this way, the collimated light extracted by the light extraction grating 310 can be all modulated by the polarization conversion element 320.

In an embodiment of the present disclosure, the light extraction grating may be formed by plating and etching a layer on the light guide plate. For example, a silicon nitride layer is plated on the light guide plate, and then the light extraction grating is formed by an etching process. The light extraction grating is configured to extract an incident light at a specific angle, and does not extract light at other angles thereby avoiding interference from the light at other angles.

In summary, according to the embodiments of the present disclosure, there is provided a backlight device, in which the light extraction structure on the light exit face of the light guide plate can make the light beam emitted by the light source, after being totally reflected in the light guide plate, to be converged or diverged, and outputted, thereby achieving a display apparatus containing the backlight device having higher transparency, higher contrast and higher light output efficiency.

In another aspect of the present disclosure, there is provided a backlight device.

According to an embodiment of the present disclosure, the backlight device includes a light guide plate 100, a light source 200, and a plurality of light extraction structures 300; wherein the light guide plate 100 has a light exit face 110 and a light entrance face 101; the light source 200 is disposed on the light entrance face 101; the light extraction structures 300 are disposed on the light exit face 110. In addition, referring to FIG. 6, the light extraction structures 300 each may also be a holographic optical element (HOE). In the embodiment, the polarizer, the polarization conversion elements and the birefringent microlenses may be removed and the holographic optical element may be used to replace the light extraction grating. In this way, the light extraction structure 300 can be simplified in structure as only a deformation of the processed medium, the change of the wavelength during reproduction, and the accuracy of the reset can be recorded on the photosensitive film material. The holographic optical element has selectivity with respect to the angle of incident light (usually $\theta \pm 0.1°$, $\theta$ is a predetermined incident angle), that is, it allows a light at a certain incident angle to pass through the light extraction holographic optical element and then to be outputted in a convergent manner and at the same time, light at other angles cannot pass through it and thus cannot be extracted through the holographic optical element, thereby suppressing stray light to a certain extent. Further, the convergence of the holographic optical element for the light beam can not only reduce the stray light caused by the diffraction of the microporous structure, but also reduce the size of the black matrix, thereby improving the transparency and contrast of the display apparatus.

Figure 6:
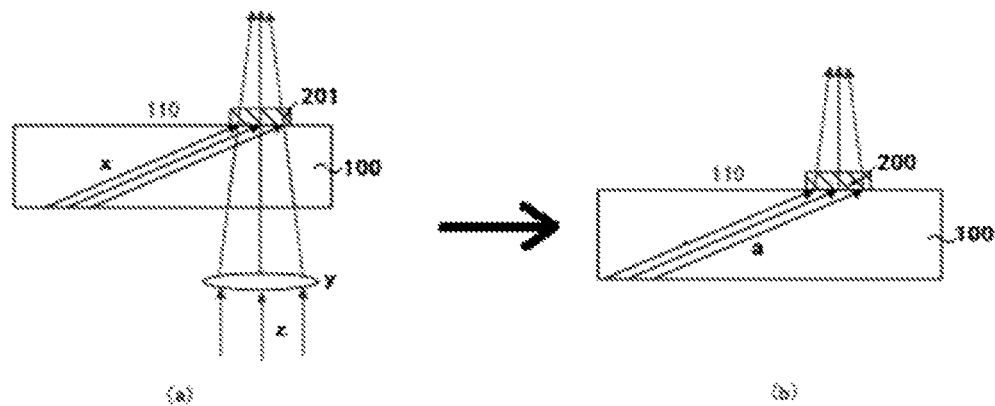
FIG. 6 is a schematic view of a manufacturing process (a) and a schematic view of a light emitting effect (b) of a holographic optical element according to an embodiment of the present disclosure.

In some specific examples, referring to (b) of FIG. 6, the holographic optical element may be formed of a photosensitive material, and a surface 301 of the holographic optical element near the light exit face 110 may be formed with interference fringes. Specifically, reference can be made to a schematic diagram of the method for making the holographic optical element in (a) of FIG. 6. An object light z, after being converged through a lens y, produces a two-beam interference with a reference light x on the photosensitive material layer 201 to generate an interference fringe in the holographic optical element 200. The incident angle of the reference light x is required to be consistent with the extraction angle of the light a in the light guide plate 100. In this way, the holographic optical element can only extract the light beam at the incident angle.

In summary, according to embodiments of the present disclosure, there is provided a backlight device, in which the light extraction structure on the light exit face of the light guide plate is selected as the holographic optical element, which can not only achieve a convergent light output mode, but also suppress the stray light due to the high selectivity of the incident light angle of the holographic optical element, thereby obtaining a display apparatus containing the backlight device with higher transparency and contrast.

In another aspect of the present disclosure, there is provided a display apparatus.

According to an embodiment of the present disclosure, referring to FIG. 2, the display apparatus may include a display module and the aforementioned backlight device, and the display module is disposed on the light exit face of the backlight device. In the embodiment, the display module may include a common electrode 21, a pixel electrode 22, a liquid crystal layer 23, a black matrix 24, an opening 25, and a cover plate 26. In this way, the electrodes provided in an ADS mode can realize a control of the liquid crystal grating using the fringe field effect. As shown in FIG. 2, the display apparatus includes: the liquid crystal layer 23 arranged on a side of a plurality of light extraction structures, so that a light outputted from the plurality of light extraction structures irradiates the liquid crystal layer; and the black matrix 24 arranged on a side of the liquid crystal layer 23 away from the light extraction structures, an opening 25 being defined in the black matrix 24. Light can exit through the opening.

According to the embodiments of the present disclosure, the display apparatus is not particularly limited to a specific type, and may be common types of display apparatus in the art, such as a display screen, a mobile phone, an electronic whiteboard, a billboard, a wearable device, and the like, which will not be repeated here. It should be noted that the display apparatus includes other necessary components and structures in addition to the above-mentioned display module and the backlight device. Taking a transparent display as an example, the display apparatus may include specifically a power supply and a housing. A person skilled in the art may refer to the requirements for specific usage of the display apparatus and make supplementation accordingly, which are not repeated here.

In summary, according to the embodiments of the present disclosure, there is provided a display apparatus, which has an increased transparency and contrast and thus an improved transparent display performance for light emitting in convergence manner of its backlight device. Those skilled in the art can understand that the features and advantages described above with respect to the backlight device are still applicable to the display apparatus, and details are not described herein again.

In the description of the present disclosure, it should be understood that the terms "first" and "second" are used for descriptive purposes only, and cannot be understood as indicating or suggesting relative importance or implicitly indicating the number of technical features indicated. Therefore, the features defined by "first" and "second" may explicitly or implicitly include at least one of the features. In the description of the present disclosure, the meaning of "a plurality" is at least two, for example, two, three, etc., unless it is specifically defined otherwise.

In the description of this specification, the description with reference to the terms "one embodiment", "some embodiments", "examples", "specific examples", or "some examples" and the like mean specific features, structures, material, or characteristic described in conjunction with the embodiments or examples is included in at least one embodiment or example of the present disclosure. In this specification, the schematic expressions of the above terms are not necessarily directed to the same embodiment or example. Moreover, the particular features, structures, materials, or characteristics described may be combined in any suitable manner in any one or more embodiments or examples. In addition, without any contradiction, those skilled in the art may combine different embodiments or examples and features of the different embodiments or examples described in this specification.

Although the embodiments of the present disclosure have been shown and described above, it can be understood that the above embodiments are exemplary and should not be construed as limitations on the present disclosure. Those skilled in the art can make change, amendment, substitution, and modification on the above embodiment within the scope of the present disclosure.

The invention claimed is:

1. A backlight device, comprising:
   a light guide plate having a light exit face and a light entrance face; and
   a plurality of light extraction structures disposed on the light exit face of the light guide plate,
   wherein a light beam is totally reflected in the light guide plate, and can enter a light extraction structure of the plurality of light extraction structures through a surface of the light extraction structure that is in contact with the light exit surface of the light guide plate, and the light extraction structure is configured to converge its output light beam when the backlight device is used in a dark display state, and diverge its output light beam when the backlight device is used in a grayscale display state.

2. The backlight device as claimed in claim 1, wherein each of the light extraction structures comprises:
   a light extraction grating arranged on the light exit face so as to extract light from the light exit face of the light guide plate;
   a polarization conversion element disposed on a side of the light extraction grating away from the light exit surface, and configured to convert the light extracted by the light extraction grating into a predetermined first polarization state in the dark display state and convert the light extracted by the light extraction grating into a predetermined second polarization state in the grayscale display state;
   a birefringent microlens disposed on a side of the polarization conversion element away from the light exit surface, and configured to converge the linearly polarized light in the first polarization state from the polarization conversion element in the dark display state and diverge the linearly polarized light in the second polarization state from the polarization conversion element in the grayscale display state, wherein the first polarization state is different from the second polarization state; and
   a filling layer covering a surface of the birefringent microlens away from the polarization conversion elements.

3. The backlight device as claimed in claim 2, further comprising a polarizer configured so that light, after passing through the polarizer, becomes linearly polarized light and enters the light guide plate.

4. The backlight device as claimed in claim 2, wherein the birefringent microlens is a convex lens and is formed of a birefringent material, and a refractive index of a material for forming the filling layer is between a first refractive index of the birefringent material for the linearly polarized light in the first polarization state and a second refractive index of the birefringent material for the linearly polarized light in the second polarization state.

5. The backlight device as claimed in claim 2, wherein the polarization conversion element of each of the light extraction structures includes a first electrode, a first orientation layer, a polarization conversion liquid crystal layer, a second orientation layer, and a second electrode which are stacked in that order.

6. The backlight device as claimed in claim 5, wherein the first electrode and the second electrode are formed of a transparent conductive material.

7. The backlight device as claimed in claim 2, wherein an orthographic projection of the light extraction grating on the light exit face and an orthographic projection of the polarization conversion element on the light exit face coincide.

8. The backlight device as claimed in claim 1, further comprising a light source, from which light enters the light guide plate through the light entrance face.

9. The backlight device as claimed in claim 3, wherein the light extraction grating is configured to extract an incident light at a specific angle and extract no light at other angles.

10. The backlight device as claimed in claim 3, wherein the light extraction grating is formed by plating a layer on the light guide plate and etching the plated layer.

11. A display apparatus comprising a display module and the backlight device as claimed in claim 1, the display module being provided on a light output face of the backlight device.

12. The display apparatus as claimed in claim 11, wherein the display module comprises:
   a liquid crystal layer arranged on a side of the plurality of light extraction structures, so that a light outputted by the plurality of light extraction structures irradiate the liquid crystal layer; and
   a black matrix arranged on a side of the liquid crystal layer away from the light extraction structures, openings being defined in the black matrix.

\* \* \* \* \*